United States Patent
Christel et al.

(10) Patent No.: US 6,730,774 B1
(45) Date of Patent: May 4, 2004

(54) METHOD AND DEVICE FOR DECONTAMINATING POLYCONDENSATES

(75) Inventors: Andreas Christel, Zuzwil (CH); Camille Borer, Flurlingen (CH); Thomas Hersperger, Wil (CH)

(73) Assignee: Buehler AG, Uzwil (CH)

( * ) Notice: Subject to any disclaimer, the term of this patent is extended or adjusted under 35 U.S.C. 154(b) by 60 days.

(21) Appl. No.: 10/129,591

(22) PCT Filed: Aug. 9, 2000

(86) PCT No.: PCT/CH00/00427
§ 371 (c)(1),
(2), (4) Date: Sep. 4, 2002

(87) PCT Pub. No.: WO01/34688
PCT Pub. Date: May 17, 2001

(30) Foreign Application Priority Data

Nov. 8, 1999 (DE) .......................... 199 53 659

(51) Int. Cl.[7] .................................................. C08F 6/00
(52) U.S. Cl. ............. 528/500; 264/219; 428/34.7; 528/271; 528/272
(58) Field of Search ............. 264/219; 428/34.7; 528/271.272, 500

(56) References Cited

U.S. PATENT DOCUMENTS

| | | | | |
|---|---|---|---|---|
| 3,804,811 A | * | 4/1974 | Rose et al. | 528/481 |
| 5,504,121 A | * | 4/1996 | West | 521/48.5 |
| 5,597,852 A | * | 1/1997 | Unger et al. | 521/48.5 |

FOREIGN PATENT DOCUMENTS

DE  WO 98/44029  *  5/2001

OTHER PUBLICATIONS

US–Publication 2002/0036361; Mar. 28, 2002 Camille Borer et.al.*

* cited by examiner

Primary Examiner—Terressa Boykin
(74) Attorney, Agent, or Firm—Reed Smith LLP

(57) ABSTRACT

The invention relates to a process and an apparatus for decontaminating polycondensates, such as RPET or similar polymeric materials, in particular comminuted PET bottles. The object is to simplify existing recycling processes. This is achieved by comminuting used PET products to give flakes, and cleaning these flakes. The flakes are further decontaminated immediately and continuously in a hot gas stream.

16 Claims, 1 Drawing Sheet

METHOD AND DEVICE FOR DECONTAMINATING POLYCONDENSATES

CROSS-REFERENCE TO RELATED APPLICATIONS

This application claims priority of PCT Application No. PCT/CH00/00427, filed Aug. 9, 2000 and German Application No. 199 53 659.7, filed Nov. 8, 1999, the complete disclosures of which are hereby incorporated by reference.

BACKGROUND OF THE INVENTION a) Field of the Invention

The invention relates to a process for decontaminating polycondensates, such as PET, PBT, PEN or PA and also to an apparatus for carrying out a process of this type. The process and apparatus are used in particular in the treatment of used PET or the like, for example of drinks bottles.

b) Description of the Related Art

Consumer products such as drinks bottles made from PET have been in use for some years, and for some years have also been collected for recycling, sorted, comminuted to give flakes, and subjected to surface-cleaning. A high proportion of PET bottles is nowadays recycled. The sorting process may take place either manually or using machinery and various optical methods, or else be a part of the surface-cleaning process. The surface-cleaning process mostly comprises various washing stages and separation stages, and conmminution of the PET drinks bottles to give flakes. However, surface-cleaned PET flakes can also be produced from PET bottles by a dry-mechanical route.

The initial assumption made by those skilled in the art and by approval bodies was that it is not possible for this collected PET material (RPET) to be reintroduced to the same application (drinks bottles). The reason given for this was contamination of the RPET by a wide variety of substances, for example drinks ingredients, such as flavors, or substances, such as solvents or household or garden poisons, inadvisedly stored in bottles. However, it has now been recognized that it is possible to provide the required removal of contaminants of this type, and various processes for this purpose have been developed. The starting point for the processes developed has been the assumption that the contaminants penetrate uniformly through the PET products. The entire mass of mixed product was therefore fed to a devolatilizing process.

A so-called Stehning method is known in which PET flakes as an end product of known recycling methods form the starting base. Such flakes are extruded in an extruder in differentiated zones in a predetermined temperature range, degassed and finally granulated. In this process it is intended to eliminate the main component of volatile side products or contaminants. Any residual contamination remaining in the product is degraded by means of a solids after-condensation (SSP). A careful and even mixing is to be achieved in the vacuum wobble dryer. The progress of the process occurs in a discontinuous manner.

According to a further method, PET is comminuted, mixed, heated and precompressed in a cutting compressor. This is followed by extrusion and degassing, with the energy input being lower due to the preceding heating. The heated material is drawn into fibers, film, etc.

According to another method, PET is comminuted into flakes, dried and thereafter extruded in a two-shaft extruder and thereafter granulated. The granulate is crystallized and later subjected discontinuously to an SSP treatment.

According to a method in accordance with U.S. Pat. No. 5,876,644, there is a mixing with a fresh melt of polyester-prepolymer after the cleaning, grinding, melting and extrusion of RPET. This mixture is pelletized and further polymerized.

U.S. Pat. No. 5,899,392 discloses a method for the decontamination of finely ground RPET, preferably under heating in hot gas, e.g. nitrogen. RPET flakes are ground into particles which are substantially smaller than 0.25 cm. A decontamination is also to be enabled by placing the finely ground particles in a liquid solution.

U.S. Pat. No. 5,807,932 describes the preparation of RPET which originates from used PET bottles. The RPET flakes are molten in the extruder, with the contamination which is originally evenly concentrated on the surface of the flakes is distributed evenly over the entire melt, as a result of which the optional subsequent decontamination from the melt is made more difficult.

WO-98/44029 discloses a decontamination of RPET from bottles (RPET flakes) in an inert gas stream of high temperature, with a solid phase after-condensation inevitably occurring during said decontamination and leading to an increase of the mean molecular weight or the intrinsic viscosity of the polymer material. In order to prevent this increase of the mean molecular weight, the volatile side products which are emitted during the solids phase after-condensation are continuously supplied to the gas stream in an equilibrium quantity, so that said solids phase after-condensation is pushed back. Although it is achieved in this way that the mean molecular weight of the treated RPET material remains substantially unchanged during the decontamination, this is gained with an additional complexity of the machinery involved.

U.S. Pat. No. 5,597,852 discloses a method for preparing solid polyester material in which there is also a step for removing volatile components and reaction products. An increase in the mean molecular weight and a rise in the intrinsic viscosity of the RPET molecules also occur inevitably in this case. At the same time, however, this step also includes the sintering of the previously comminuted and thereafter healed material. In a second step, the sintered material, which is relieved of volatile components, is mixed with new material. By sintering the material particles, the bare surface is reduced in the entirety, so that any escape of the contaminants close to the surface from the sinter block is made more difficult. It was also not recognized here that in the decontamination of RPET flakes from PET vessels, the primary goal is to remove the contaminants from the zone directly below the surface of the flakes.

U.S. Pat. No. 3,804,811 also discloses a method for preparing previously cleaned polyester material, in which the RPET material which is cut into flakes or other parts is subjected to a heat treatment in a furnace. No RPET material is processed which originates from PET vessels, especially PET beverage bottles. The sole purpose is to increase the mean molecular weight or the intrinsic viscosity of the RPET material and thus its tensile strength.

According to a so-called URRC method, the PET flakes are wetted at first with NaOH and thereafter treated in a rotary tubular kiln at high temperature over a number of hours. Layers close to the surface of the flakes are removed by caustics in this case. This represents a certain departure from the aforementioned methods, but one must consider in this case a certain material loss by the etching in addition to a disposal problem for the residual matter.

The complexity in respect of process and equipment of this state of the art for the purpose of decontaminating RPET is high.

OBJECT AND SUMMARY OF THE INVENTION

The invention is therefore based on the primary object of providing a method for the decontamination of RPET which avoids the disadvantages of the state of the art and can be performed continuously. The solution of this object occurs in accordance with the invention for a process for decontaminating polycondensates, such as RPET or similar polymers, comprising the steps of beginning, where appropriate, with presorting, cleaning, and comminuting the contaminated material to give flakes or the like, followed by a further decontamination step and during this decontamination step, subjecting flakes to continuous and adequate passage of a hot gas stream (excess gas). A further object of the invention is to provide a suitable apparatus for the decontamination of RPET to perform the method just described. This occurs in an apparatus in accordance with the method of the invention comprising a device for comminuting objects of a polycondensate into flakes and a device for cleaning the flakes as well as a further device for decontamination, with the device for decontamination being provided downstream with an extruder for melting and granulating the decontaminated polycondensate, wherein the device for the further decontamination is a shaft reacher for after-condensation in solid phase in which a removal of the contaminants occurs without prior homogenization from the layers of the flakes which are close to the surface.

The invention is based on the finding that the contaminants are not distributed evenly over the RPET and are predominantly present on the surface or in the regions close to the surface. This allows better using the cleaning potential of treatment methods in the hot gas stream. In the normal case, a crystallization and/or SSP treatment is sufficient in order to clean RPET suitable for foodstuffs and to use the same again as packaging for foodstuffs, e.g. beverage bottles.

Preferably, the decontamination occurs continuously in the hot gas stream of a crystallization and/or SSP process, which allows the substantial use of conventional principal devices and or process sequences for the crystallization and after-condensation (including the increase of the I.V. value) of PET and the like in the solid phase. Such apparatuses are described, for example, in EP-A-379684. A reduction to a three-phase process can be given in accordance with the invention. Air can be used at temperatures up to approx. 180° C. Nitrogen is used, however, at temperatures from or above 180° C. as hot gas.

The decontamination of PET may therefore be entirely integrated into an SSP plant or an SSP process. Parts of the process may very well take place without intermediate cooling, thus saving energy.

If, after the heating process, polymer flakes are subjected to sorting by color, using simple optical means, meticulous separation of materials can take place in a simple manner, so that further processing which is appropriate to the type of material can take place, using a single type of material. For example, PET hardly discolors on heating to near its crystallization point, PVCs become black, and other materials become brown. This type of sorting by color may take place prior to or after crystallization or postcondensation, and the heating may if required take place in separate equipment, for example in a fluidized bed.

Studies made by the applicant have confirmed the above-mentioned assumption. Depending on temperature and residence time, crystallization and/or postcondensation give cleaning efficiency of at least 99%. Values as high as this may be achieved even at relatively short residence times of about 2 h and at a temperature of about 190° C., or 20 minutes at a temperature of 210° C., indicating that contamination is near to the surface. In contrast, prior extrusion of the PET reduced the concentration of the contaminants (as also occurs during crystallization) but at the same time these become more homogeneously distributed, and in deeper-lying layers, increasing diffusion pathways and, at least on some occasions, lowering decontamination efficiency in crystallization and/or postcondensation.

From the studies it is clear that contamination takes place primarily on the surface, and even if there is some extent of diffusion within more deeply-lying layers, there is a steep concentration gradient in the material. Contaminants may be removed from the layers near to the surfaces of the RPET flakes with great efficiency without prior homogenization.

The invention is described in more detail below in an example, using a drawing.

DESCRIPTION OF THE PREFERRED EMBODIMENTS

Figure 1:
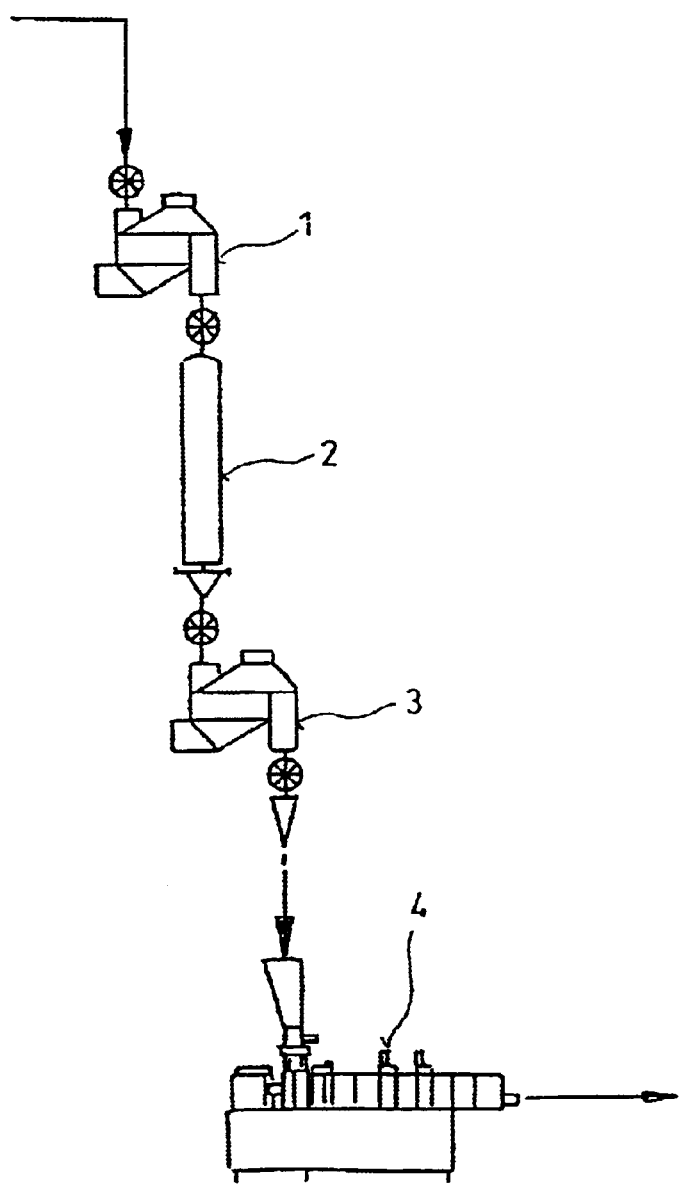
FIG. 1, shows one embodiment of a decontamination of PET with crystallization and SSP.

Commercially available post-consumer PET bottles (RPET) are subjected to the following recycling process. The comminution of the bottles to give flakes can often take place at an early stage, at the retail outlet or in collection centers. The flakes are then washed in the usual way, and their surfaces are dried. The flakes then pass directly into a crystallizer 1, in this case a fluidized bed, the applicant's model OTWG. Using a gas temperature (air) of 180° C., the material is crystallized for a residence time of about 20 minutes. The flakes then pass directly into a tower reactor 2, where they are continuously postcondensed for a period of at least 2 h in countercurrent to an $N_2$ gas stream (temperature about 220° C.). The I.V. achieved here is from about 0.78 to 0.84. The decontaminated RPET then passes into a cooler 3. The cleaning efficiency is from at least 99.6% to >99.9%, based on toluene. Chlorobenzene or benzophenone, or the like, may also be removed with similar efficiency.

If necessary, there may also be a preheater provided upstream of the tower reactor 2, or the crystallization may take place at a higher temperature under an inert gas (preferably $N_2$), and similarly prior crystallization may be dispensed with. An extruder 4 could also have been arranged to take the place of the cooler.

In another example, surface-cleaned flakes are crystallized in the crystallizer 1 for about 20 minutes at a temperature of about 210° C. in the inert gas stream. The crystallized flakes then pass directly into the cooler 3 or are cooled in a separate region within the crystallizer 1. An extruder 4 may be arranged to take the place of the cooler 3. The cleaning efficiency observed is again greater than 99%, based on toluene.

In comparison, postcondensation without prior extrusion exhibits very good cleaning efficiency, meaning that prior repelletizing of the PET material may be dispensed with, or should be dispensed with in relation to decontamination.

Nevertheless, extrusion following the postcondensation can be desirable, for example to remove non-melting substances with the aid of a melt filter. During extrusion and pelletizing, release of acetaldehyde is to be expected, but this can be suppressed by using suitable additives. Suitable addition of reactive components for increasing I.V. (and also of other additives) may, where appropriate, permit postcondensation to be dispensed with.

While the foregoing description and drawings represent the present invention, it will be obvious to those skilled in the art that various changes may be made therein without departing from the true spirit and scope of the present invention

What is claimed is:

1. A method for the decontamination of polycondensates, especially of RPET, which are obtained from comminuted PET vessels, especially PET beverage bottles, comprising the steps of:

starting with presorting, cleaning and comminuting the contaminated material into flakes;

followed by a further step of decontamination of the flakes, with crystallization or after-condensation occurring during the decontamination being followed by extrusion and the after-condensed molten polycondensates being granulated;

wherein the flakes during the contamination step are flowed in a continuous and adequate manner by a hot gas stream in such a way that a removal of the contaminants occurs without prior homogenization from layers of the flakes which are close to the surface of the flakes.

2. The method as claimed in claim 1, wherein a crystallization of the flakes occurs at a temperature of at least 200° C. during at least fifteen minutes.

3. The method as claimed in claim 1, wherein an after-condensation occurs in a solid phase at a temperature of at least 180° C. in an inert gas stream during at least 2 h.

4. The method as claimed in claim 1, wherein the further step of decontamination comprises crystallization, followed by an after-condensation in solid phase.

5. The method as claimed in claim 1, wherein melting substances are separated in a melt filter from the after-condensed molten polycondensate.

6. The method as claimed in claim 1, wherein the cleaned flakes are heated and are subjected to a visual sorting according to color.

7. The method as claimed in claim 1, wherein the crystallized and/or after-condensed decontaminated flakes are supplied directly and without cooling to an injection molding device.

8. The method as claimed in claim 1, wherein the after-condensed flake are subjected to a surface etching.

9. The method as claimed in claim 1, wherein the flakes are superficially cleaned prior to the further step of decontamination.

10. An apparatus for performing a method as claimed in claim 1, comprising a device for comminuting objects of a polycondensate into flakes and a device for cleaning said flakes as well as a further device for decontamination, with the device for decontamination being provided downstream with an extruder for melting and granulating the decontaminated polycondensate, wherein the device for the further decontamination is a shaft reactor for after-condensation in solid phase in which a removal of the contaminants occurs without prior homogenization from the layer of the flakes which are close to the surface.

11. An apparatus for performing a method as claimed in claim 1 comprising:

a device for comminuting objects of a polycondensate into flakes;

a device for cleaning said flakes; and a further device for decontamination;

the device for decontamination being provided downstream with an extruder for melting and granulating the decontaminated polycondensate;

the device for further decontamination being a crystallizer in which the removal of the contaminants occurs without prior homogenization from the layers of the flakes which are close to the surface.

12. The apparatus as claimed in claim 10, wherein the shaft reactor is provided upstream with a crystallizer.

13. The apparatus as claimed in claim 11, wherein the crystallizer is a fluidized bed.

14. The apparatus as claimed in claim 10, wherein a cooler is provided downstream of the further device for decontamination.

15. A method for the decontamination of polycondensates which are obtained from comminuted PET vessels comprising the steps of:

starting with presorting, cleaning and comminuting the contaminated material into flakes;

followed by a further step decontamination of the flakes, with crystallization or after-condensation occurring during the decontamination being followed by extrusion and the after-condensed molten polycondensates of recycled polyethylene terephthalate (RPET) being granulated;

wherein the flakes during the contamination step are flowed in a continuous and adequate manner by a hot gas stream in such away a way that a removal of the contaminants occurs without prior homogenization from layers of the flakes which are close to the surface of the flakes; and wherein an after-condensation occurs in a solid phase at a temperature of at least 180° C. in an inert gas stream during at least 2 h.

16. A method for the decontamination of polycondensates which are obtained from comminuted PET vessels, comprising the steps of:

starting with presorting, cleaning and comminuting the contaminated material into flakes;

followed by a further step of decontamination of the flakes, with crystallization or after-condensation occurring during the decontamination being followed by extrusion and the after-condensed molten polycondensates of recycled polyethylene terephthalate (RPET) being granulated;

wherein the flakes during the contamination step are flowed in a continuous and adequate manner by a hot gas stream in such away a way that a removal of the contaminants occurs without prior homogenization from layers of the flakes which are close to the surface of the flakes; and wherein non-melting substances are separated in a melt filter from the after-condensed molten polycondensate.

* * * * *